United States Patent
Sarett et al.

(10) Patent No.: US 11,370,454 B2
(45) Date of Patent: Jun. 28, 2022

(54) PARALLEL AND FAILOVER AUTONOMY SYSTEMS

(71) Applicant: Nuro, Inc., Mountain View, CA (US)

(72) Inventors: Matthew Jeremy Sarett, Mountain View, CA (US); Ryan Keating, Mountain View, CA (US); Nicholas David Carlevaris-Bianco, Santa Clara, CA (US); Pratik Agarwal, Mountain View, CA (US); David Ian Ferguson, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 141 days.

(21) Appl. No.: 17/015,423

(22) Filed: Sep. 9, 2020

(65) Prior Publication Data

US 2021/0094589 A1    Apr. 1, 2021

Related U.S. Application Data (60) Provisional application No. 62/906,302, filed on Sep. 26, 2019.

(51) Int. Cl.
| | | |
|---|---|---|
| *B60W 60/00* | (2020.01) | |
| *B60W 50/02* | (2012.01) | |
| *B60W 30/09* | (2012.01) | |
| *B60W 30/095* | (2012.01) | |
| *B60W 50/029* | (2012.01) | |

(52) U.S. Cl.
CPC ...... *B60W 60/00186* (2020.02); *B60W 30/09* (2013.01); *B60W 30/095* (2013.01); *B60W 50/0225* (2013.01); *B60W 2050/0292* (2013.01); *B60W 2554/4041* (2020.02)

(58) Field of Classification Search
CPC .......... B60W 60/00186; B60W 30/09; B60W 30/095; B60W 50/0225; B60W 2050/0292; B60W 2554/4041; B60W 50/023
See application file for complete search history.

(56) References Cited

U.S. PATENT DOCUMENTS

| | | |
|---|---|---|
| 9,465,388 B1 | 10/2016 | Fairfield et al. |
| 9,632,502 B1 | 4/2017 | Levinson et al. |
| 9,720,410 B2 | 8/2017 | Fairfield et al. |
| 10,386,836 B2 | 8/2019 | Lockwood et al. |

(Continued)

*Primary Examiner* — Jason Holloway
(74) *Attorney, Agent, or Firm* — Edell, Shapiro & Finnan, LLC (57) ABSTRACT

An autonomous vehicle is operated using a main autonomy system that analyzes data collected by a sensor system of the autonomous vehicle to determine a trajectory of travel of the autonomous vehicle, and wherein the main autonomy system provides instructions to a propulsion system of the autonomous vehicle to cause the propulsion system to navigate the autonomous vehicle according to the trajectory. In response to determining that navigating the autonomous vehicle according to the trajectory is likely to result in collision, instructions are provided from a parallel autonomy system to the propulsion system to cause the autonomous vehicle to avoid collision. In response to detecting a fault in the main autonomy system, control of the propulsion system is provided from the main autonomy system to a failover autonomy system, wherein the failover autonomy system is configured to override the propulsion system.

22 Claims, 9 Drawing Sheets

(56) References Cited

U.S. PATENT DOCUMENTS

| | | |
|---|---|---|
| 10,401,852 B2 | 9/2019 | Levinson et al. |
| 2019/0337526 A1* | 11/2019 | Rave ........................ G06F 21/74 |
| 2021/0048818 A1* | 2/2021 | Funke ................ B60W 60/0011 |
| 2021/0179123 A1* | 6/2021 | Yamada .................. G08G 1/166 |
| 2021/0394770 A1* | 12/2021 | Rocha ..................... G06V 20/56 |

* cited by examiner

PARALLEL AND FAILOVER AUTONOMY SYSTEMS

CROSS REFERENCE TO RELATED APPLICATION

This application claims priority to U.S. Provisional Application No. 62/906,302, filed Sep. 26, 2019, entitled "Parallel and Failover Autonomy Systems," the entirety of which is incorporated herein by reference.

TECHNICAL FIELD

The present disclosure relates to providing backup autonomous capabilities for use in an environment in which human operators may remotely operate autonomous vehicles.

BACKGROUND

Delivering goods and services by autonomous vehicles improves society by allowing people to engage in productive work, rather than spending time running errands, e.g., travelling to merchants. As the use of autonomous vehicles expands, the importance of the ability to safely operate the autonomous vehicle is increasing.

DESCRIPTION OF EXAMPLE EMBODIMENTS

Overview

In one embodiment, a vehicle with autonomous capabilities includes a main or primary autonomy system and a parallel autonomy system. The vehicle also includes a failover autonomy system. The parallel autonomy system and the failover autonomy system form a backup autonomy system. The parallel autonomy system is arranged to operate in parallel with the main autonomy system and is also arranged to supplement the operation of the main autonomy system by detecting failures in the main autonomy system that are not detected by the main autonomy system. The parallel autonomy system may intervene when there is a failure in the main autonomy system that is not detected by the main autonomy system. An overall platform for the operation of the autonomous vehicle includes a remotely operated system which allows a remote human operator to substantially control, e.g., drive the vehicle. The failover autonomy system is configured to intervene when there is a failure in the main autonomy system that is detected by the main autonomy system.

Example Embodiments

Figure 1:
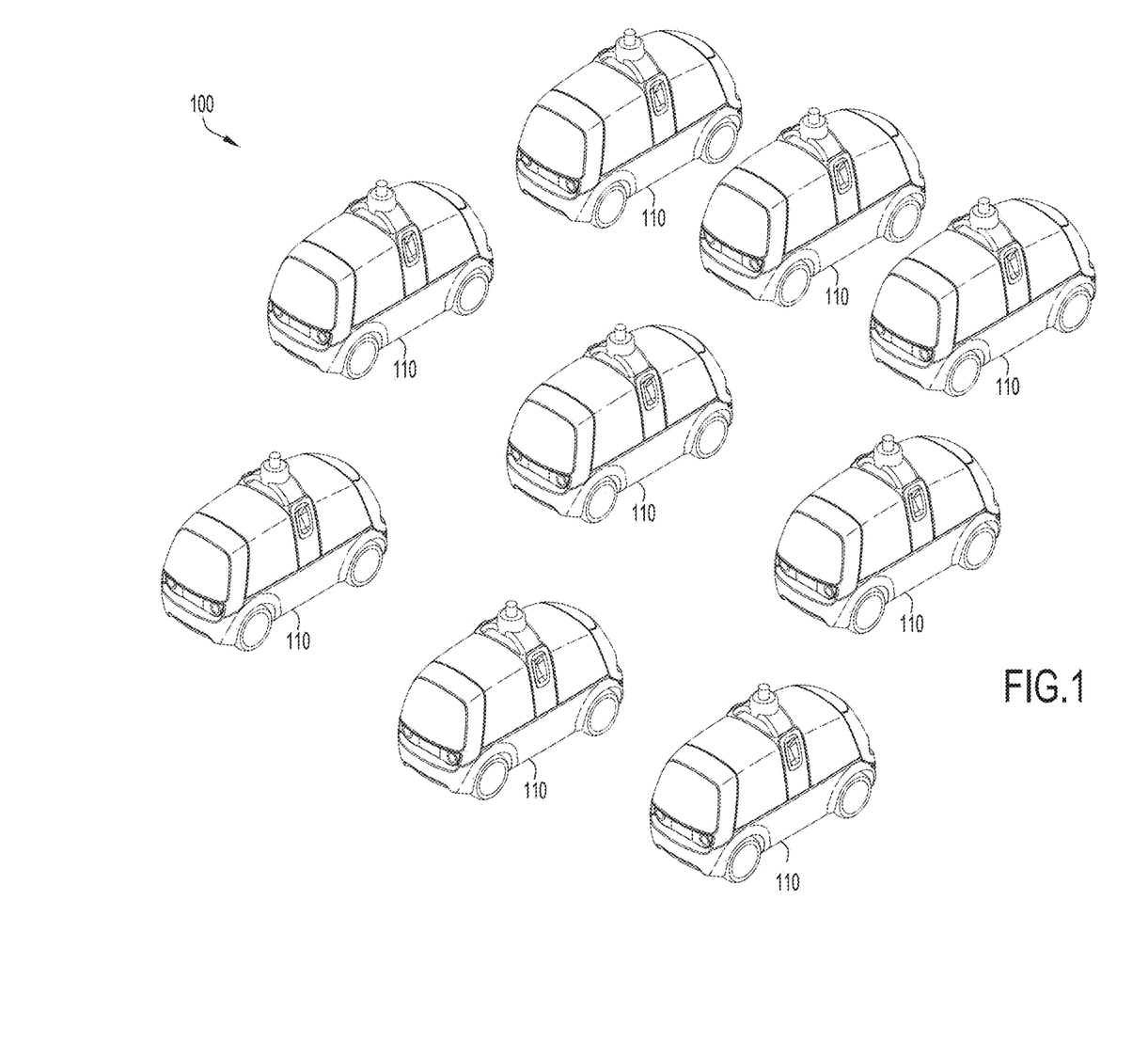
FIG. 1 is a diagrammatic representation of an autonomous vehicle fleet, according to one example embodiment.

Referring initially to FIG. 1, an autonomous vehicle fleet will be described in accordance with an embodiment. An autonomous vehicle fleet 100 includes a plurality of autonomous vehicles 110, or robot vehicles. Autonomous vehicles 110 are generally arranged to transport and/or to deliver cargo, items, and/or goods. Autonomous vehicles 110 may be fully autonomous and/or semi-autonomous vehicles. In general, each autonomous vehicle 110 may be a vehicle that is capable of travelling in a controlled manner for a period of time without intervention, e.g., without human intervention. As will be discussed in more detail below, each autonomous vehicle 110 may include a power system, a propulsion or conveyance system, a navigation module, a control system or controller, a communications system, a processor, and a sensor system.

Dispatching of autonomous vehicles 110 in autonomous vehicle fleet 100 may be coordinated by a fleet management module (not shown). The fleet management module may dispatch autonomous vehicles 110 for purposes of transporting, delivering, and/or retrieving goods or services in an unstructured open environment or a closed environment.

Figure 2:
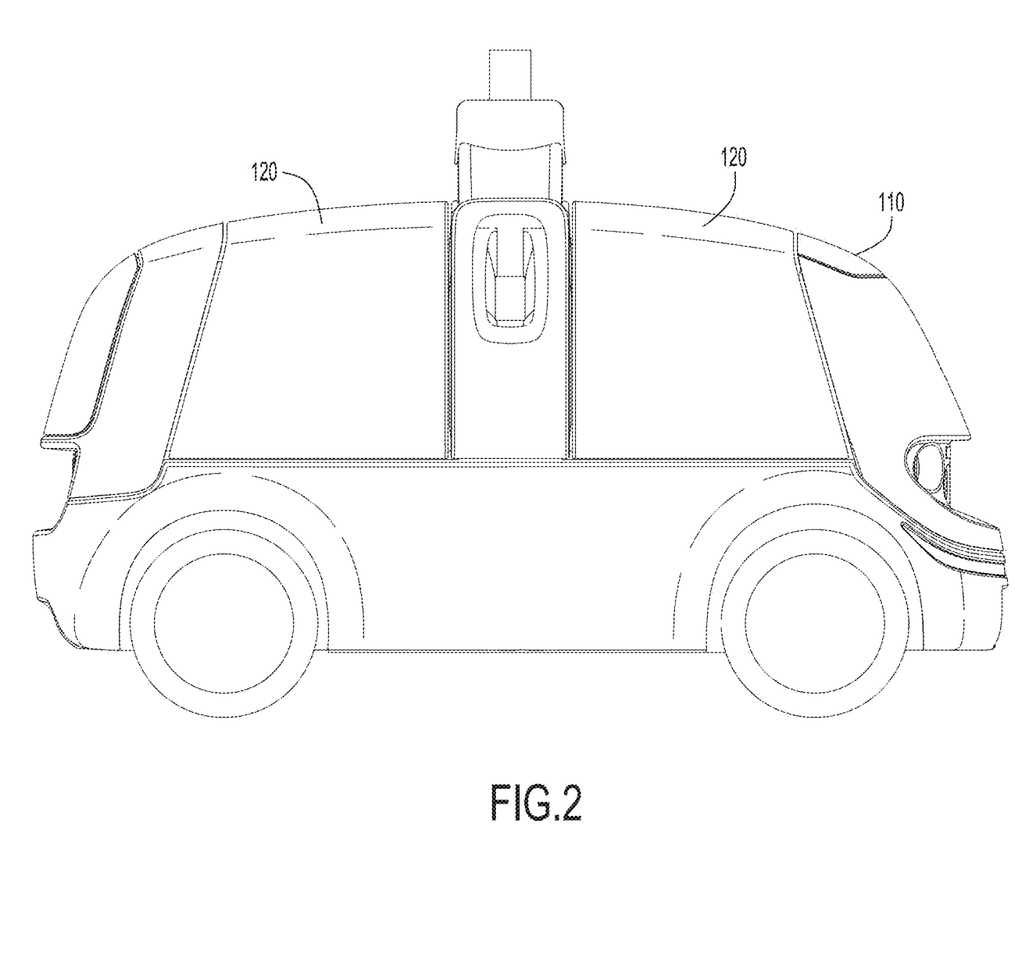
FIG. 2 is a diagrammatic representation of a side of an autonomous vehicle, according to an example embodiment.

FIG. 2 is a diagrammatic representation of a side of an autonomous vehicle, e.g., one of autonomous vehicles 110 of FIG. 1, in accordance with an embodiment. Autonomous vehicle 110, as shown, is a vehicle configured for land travel. Typically, autonomous vehicle 110 includes physical vehicle components such as a body or a chassis, as well as conveyance mechanisms, e.g., wheels. In one embodiment, autonomous vehicle 110 may be relatively narrow, e.g., approximately two to approximately five feet wide, and may have a relatively low mass and relatively low center of gravity for stability. Autonomous vehicle 110 may be arranged to have a working speed or velocity range of between approximately one and approximately forty-five miles per hour (mph), e.g., approximately twenty-five miles per hour. In some embodiments, autonomous vehicle 110 may have a substantially maximum speed or velocity in range between approximately thirty and approximately ninety mph.

Autonomous vehicle 110 includes a plurality of compartments 120. Compartments 120 may be assigned to one or more entities, such as one or more customer, retailers, and/or vendors. Compartments 120 are generally arranged to contain cargo, items, and/or goods. Typically, compartments 120 may be secure compartments. It should be appreciated that the number of compartments 120 may vary. That is, although two compartments 120 are shown, autonomous vehicle 110 is not limited to including two compartments 120.

Figure 3:
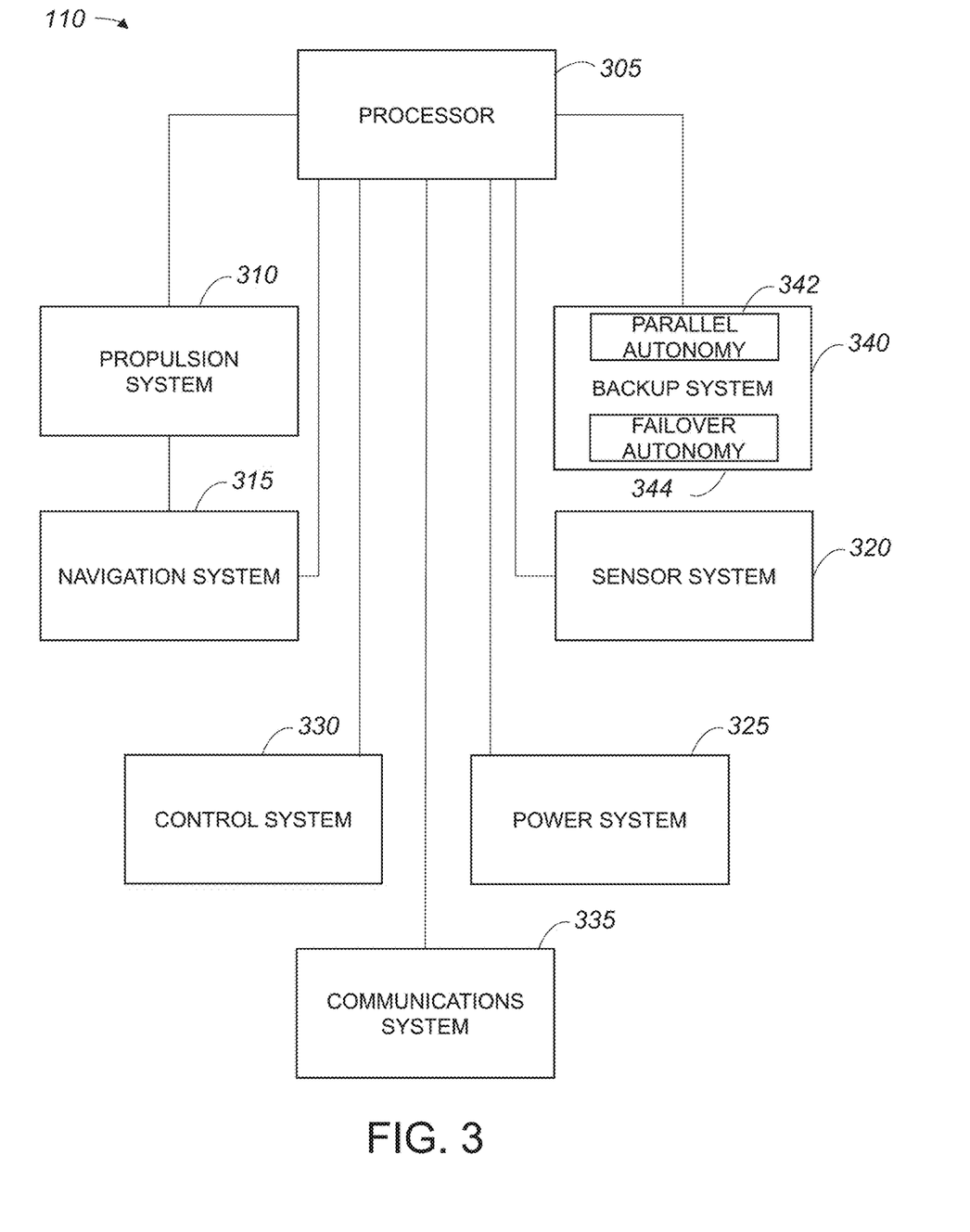
FIG. 3 is a block diagram representation of an autonomous vehicle, according to an example embodiment.

FIG. 3 is a block diagram representation of an autonomous vehicle, e.g., autonomous vehicle 110 of FIG. 1, in accordance with an embodiment. An autonomous vehicle 110 includes a processor 305, a propulsion system 310, a navigation system 315, a sensor system 320, a power system 325, a control system 330, and a communications system 335. It should be appreciated that processor 305, propulsion system 310, navigation system 315, sensor system 320, power system 325, and communications system 335 are all coupled to a chassis or body of autonomous vehicle 110. In the described embodiment, autonomous vehicle 110 includes a backup system 340 arranged to provide redundancy and/or additional safety capabilities for autonomous vehicle 110.

Processor 305 is arranged to send instructions to and to receive instructions from or for various components such as propulsion system 310, navigation system 315, sensor system 320, power system 325, and control system 330. Propulsion system 310, or a conveyance system, is arranged to cause autonomous vehicle 110 to move, e.g., drive. For example, when autonomous vehicle 110 is configured with a multi-wheeled automotive configuration as well as steering, braking systems and an engine, propulsion system 310 may be arranged to cause the engine, wheels, steering, and braking systems to cooperate to drive. In general, propulsion system 310 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 315 may control propulsion system 310 to navigate autonomous vehicle 110 through paths and/or within unstructured open or closed environments. Navigation system 315 may include at least one of digital maps, street view photographs, and a global positioning system (GPS) point. Maps, for example, may be utilized in cooperation with sensors included in sensor system 320 to allow navigation system 315 to cause autonomous vehicle 110 to navigate through an environment.

Sensor system 320 includes any sensors, as for example LiDAR, radar, ultrasonic sensors, microphones, altimeters, and/or cameras. Sensor system 320 generally includes onboard sensors which allow autonomous vehicle 110 to safely navigate, and to ascertain when there are objects near autonomous vehicle. In one embodiment, sensor system 320 may include propulsion systems sensors that monitor drive mechanism performance, drive train performance, and/or power system levels.

Power system 325 is arranged to provide power to autonomous vehicle 110. Power may be provided as electrical power, gas power, or any other suitable power, e.g., solar power or battery power. In one embodiment, power system 325 may include a main power source, and an auxiliary power source that may serve to power various components of autonomous vehicle 110 and/or to generally provide power to autonomous vehicle 110 when the main power source does not include sufficient power.

Communications system 335 allows autonomous vehicle 110 to communicate, as for example, wirelessly, with a fleet management system (not shown) that allows autonomous vehicle 110 to be controlled remotely. Communications system 335 generally obtains or receives data, stores the data, and transmits or provides the data to a fleet management system and/or to autonomous vehicles 110 within a fleet 100. The data may include, but is not limited to including, information relating to scheduled requests or orders, information relating to on-demand requests or orders, and/or information relating to a need for autonomous vehicle 110 to reposition itself, e.g., in response to an anticipated demand.

Communications system 335 may be configured to communicate with a remote human operator. For example, communications system 335 may communicate information, e.g., visual information, captured by sensor system 320, e.g., cameras running at a relatively high frame rate, to a remote human operator, to enable the remote human operator to visualize the surroundings of autonomous vehicle 110. Further, communications system 335 may obtain instructions from a remote human operator for controlling propulsion system 310 to move, e.g., to drive, autonomous vehicle 110.

Autonomous capabilities may be provided, at least in part, through propulsion system 310, navigation system 315, sensor system 320, power system 325, and control system 330. Backup system 340 is arranged to substantially provide backup, e.g., alternate, capabilities that allow autonomous vehicle 110 to continue to drive safely and/or to cease driving when autonomous vehicle 110 faces an issue, e.g., a potential safety issue or an unforeseen circumstance. It should be appreciated that backup system 340 may cooperate with propulsion system 310, navigation system 315, sensor system 320, power system 325, and control system 330 to facilitate the operation of autonomous vehicle 110 in response to issues associated with autonomous capabilities.

In the embodiment as shown, backup system 340 includes a parallel autonomy system 342 and a failover autonomy system 344. Parallel autonomy system 342 generally operates in parallel to the autonomous capabilities provided by propulsion system 310, navigation system 315, sensor system 320, power system 325, and control system 330, as will be discussed below with reference to FIG. 6. Failover autonomy system 344 is arranged to substantially override a planned failover trajectory, or path, for autonomous vehicle 110 in the event that the planned failover trajectory appears as if it is likely to lead to a collision, as will be discussed below with reference to FIG. 7. A failover trajectory may include a trajectory that ends with autonomous vehicle 110 coming to a stop; for example, navigating autonomous vehicle 110 according to one failover trajectory may involve autonomous vehicle 110 decelerating, moving to a shoulder of a roadway, and braking to a halt. It should be appreciated that a collision may be considered to be likely if the probability that a collision will occur is greater than the probability that the collision will not occur.

An autonomous vehicle may operate in autonomous mode, i.e., the autonomous vehicle may operate autonomously, or the autonomous vehicle may be operated remotely, i.e., a remote human operator may effectively control and/or command the autonomous vehicle. Remotely operating a fully-autonomous or a semi-autonomous vehicle, e.g., via teleoperations, may be appropriate in various situations. For example, the capability for a human operator to remotely operate an autonomous vehicle is beneficial even where the autonomous vehicle can be locally operated by a local human operator, especially in situations in which the remote human operator has a better view of upcoming treacherous conditions. The capability for a human operator to remotely operate an autonomous vehicle that may not be locally operated by a local human operator allows the remote human operator to take control of the autonomous vehicle when the remote human operator becomes aware that the autonomous vehicle may be able to head into environment in which it would be preferable for the remote human operator to drive the autonomous vehicle.

Figure 4:
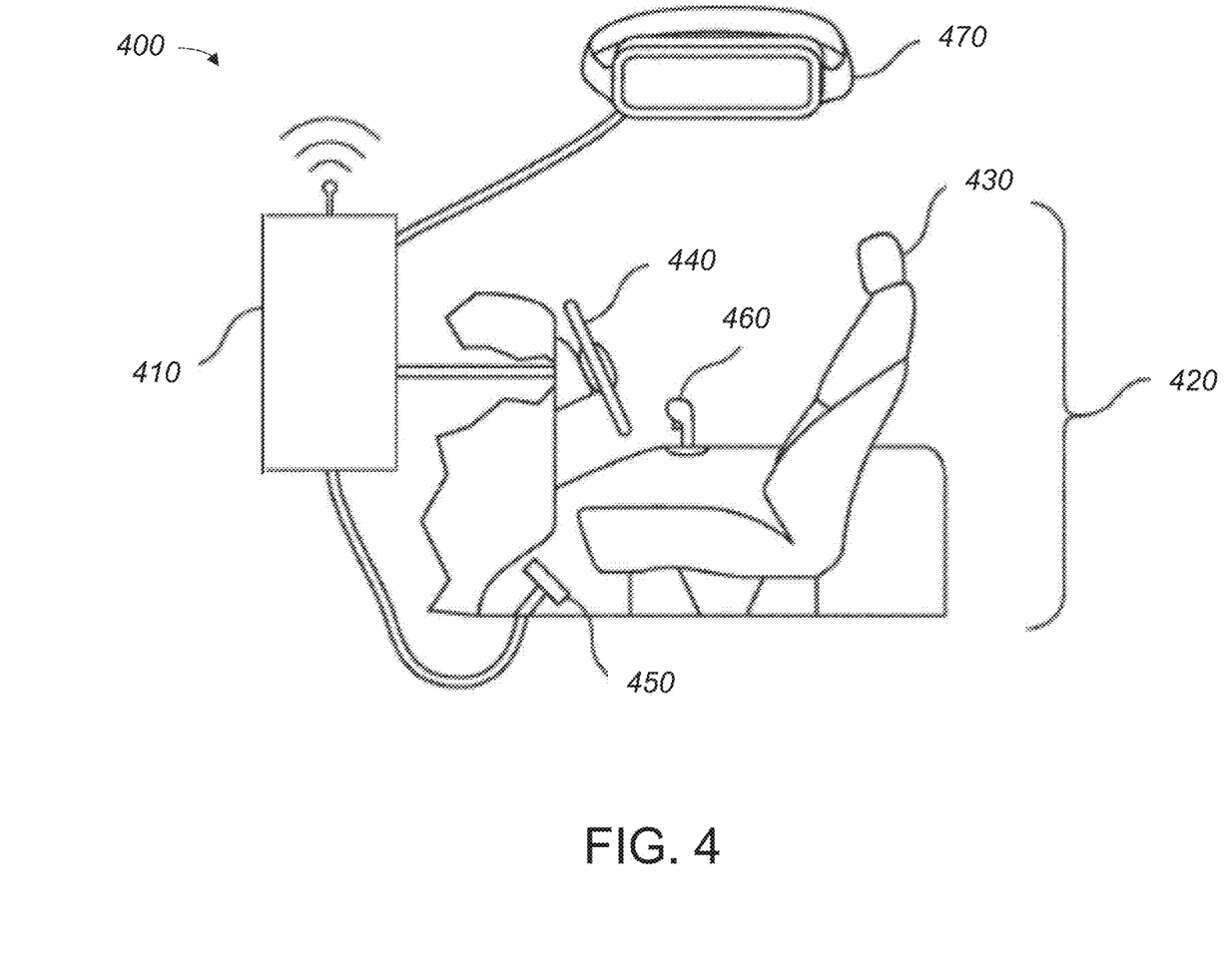
FIG. 4 is a diagrammatic representation of remote human operator system suitable for use in remotely operating a vehicle, e.g., an autonomous vehicle, according to an example embodiment.

FIG. 4 is a remote human operator system suitable for use in remotely operating a vehicle, e.g., an autonomous vehicle, in accordance with an embodiment. A system 400 includes communication/processing equipment 410 and a human operator station 420. Human operator station 420 may resemble, in one embodiment, a driver station in a typical automobile, and may include a driver seat 430, a steering wheel 440, acceleration and brake pedals 450, and a gear shifter 460. Human operator station 420 also includes a visual interface 470 that is configured to allow a human operator to view the environment in which an autonomous vehicle that is to be driven or otherwise controlled by human operator station 420 is driving.

In one embodiment, visual interface 470 is in the form of a virtual-reality (VR) or augmented-reality (AR) headset. Visual interface 470 is not limited, however, to being a VR or an AR headset. By way of example, human operator station 420 may include one or more display screens. Display screens may be LED, LCD, and/or OLED display screens.

Human operator station 420 may be configured to have the approximate touch response of an actual driver station in an automobile. For example, steering wheel 440 may be configured to have a touch response that is similar to that of power steering in an actual automobile, and pedals 450 may be configured to approximate the resistance of pedals in an actual automobile.

Steering wheel 440, acceleration and brake pedals 450, and gear shifter 460 may be connected to or otherwise coupled to communication/processing equipment 410. Communication/processing equipment 410 enables communication between human operator station 420 and the autonomous vehicle that is configured to be remotely operated using human operator station 420. As shown, human operator station 420 may be connected to communication/processing equipment 410 by physical cables and connections. It should be appreciated, however, that human operator station 420 may instead be wirelessly coupled to communication/processing equipment 410 using any suitable method including, but not limited to including, Bluetooth and Wi-Fi. In addition, while human operator station 420 may be substantially directly connected to communication/processing equipment 410, human operator station 420 may instead be coupled to communication/processing equipment 410 through intermediate devices and/or networks, e.g., wireless and/or cellular networks.

Communication/processing equipment 410 may establish communications, as for example communications with an autonomous vehicle and/or with visual interface 470, using various communications technologies including, but not limited to including, IEEE 802.11x (Wi-Fi), cellular 3G/4G/5G, wired communications, and/or other wired or wireless communication protocols. It should be appreciated that communication/processing equipment 410 generally includes one or more processors, memories, machine instructions, and/or hardware for processing visual information for display by the visual interface 470. Substantially any suitable method may be used to communicate, to process, and to display visual information.

Communication/processing equipment 410 is generally arranged to process signals from human operator station 420, and to translate the signals into control instructions for controlling an autonomous vehicle. In one embodiment, communication/processing equipment 410 is arranged to provide teleoperations capabilities. The signals provided by communication/processing equipment 410 may include control instructions for controlling a conveyance system of the autonomous vehicle to cause the autonomous vehicle to drive or to otherwise travel.

When a human operator turns or steers steering wheel 440, communication/processing equipment 410 may send corresponding control instructions to an autonomous vehicle to instruct the autonomous vehicle to turn or to drive in the direction indicated by the way the human operator steers steering wheel 440. In addition, when a human operator accelerates or brakes using pedals 450 of the operator station 420, communication/processing equipment 410 sends corresponding control instructions to the autonomous vehicle to instruct the autonomous vehicle to accelerate or brake, respectively.

The ability to remotely control an autonomous vehicle facilitates the safe operation of the autonomous vehicle. The inclusion of a backup system, e.g., backup system 340 of FIG. 3, further facilitates the same operation of the autonomous vehicle by providing functionality which may substantially take over control of the autonomous vehicle in the event that a main autonomy system, also referred to as the primary autonomy system, has a failure, an error, or a bug.

Figure 5:
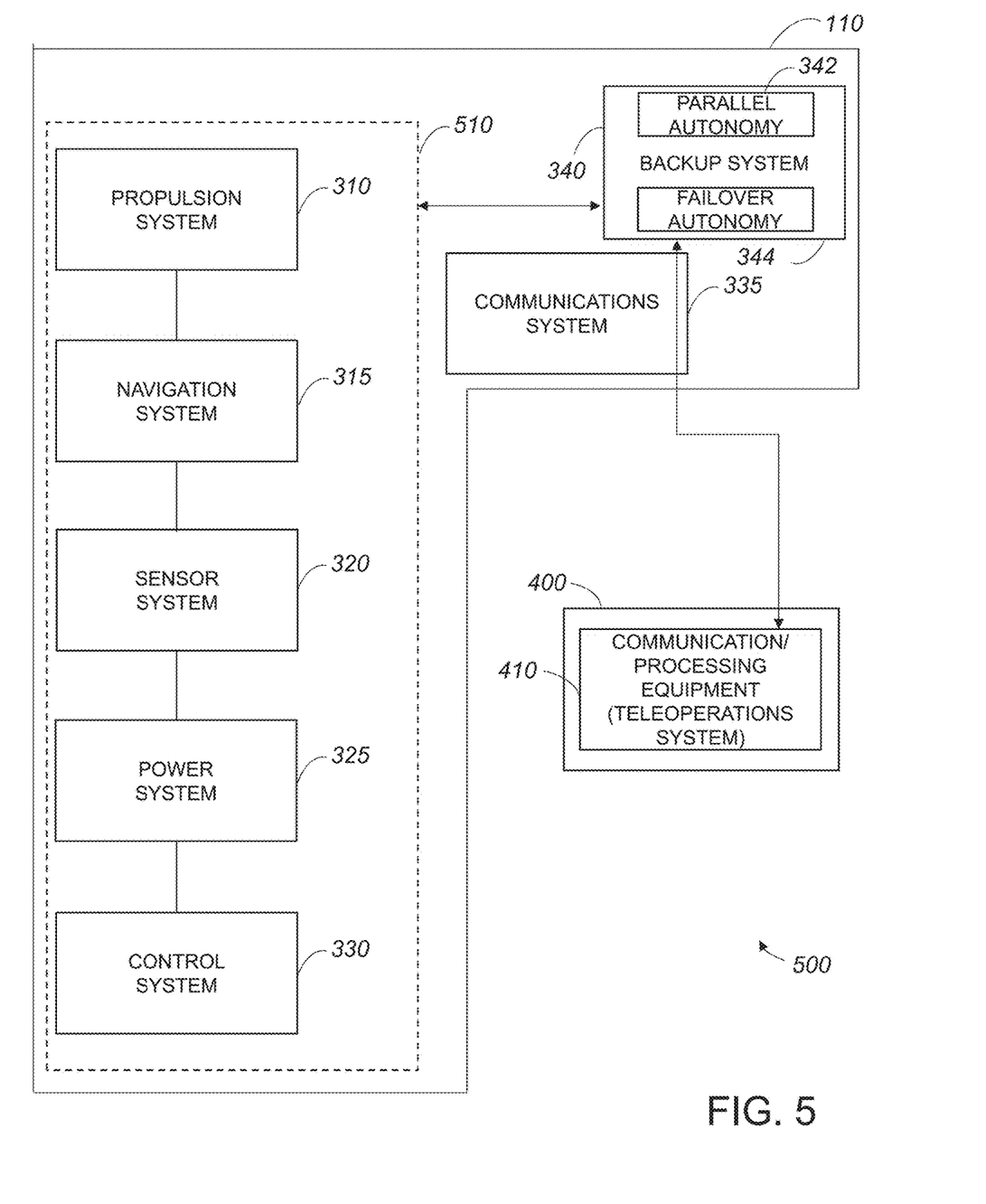
FIG. 5 is a block diagram representation of an overall system in which a backup system facilitates the safe operation of an autonomous vehicle, according to an example embodiment.

FIG. 5 is a block diagram representation of an overall system in which a backup system facilitates the safe operation of an autonomous vehicle in accordance with an embodiment. An overall system 500 generally includes an autonomous vehicle 110, a system 400, e.g., a remote human operator system, and a main autonomy system 510. System 400 is arranged to provide remote control of autonomous vehicle 110, as for example when it is determined that using system 400 to remotely drive autonomous vehicle 110 is preferable over allowing the main autonomy system 510 drive autonomous vehicle 110.

Main autonomy system 510 may include, at least in part, functionality provided by propulsion system 310, navigation system 315, sensor system 320, power system 325, and control system 330. Backup system 340 is arranged to provide backup autonomy capabilities in the event of issues arising with main autonomy system 510 or with communication/processing equipment 410. For example, backup system 340 may assume control of autonomous vehicle 110 when main autonomy system 510 fails, or when the control provided from a remote human operator via communication/processing equipment 410 appears to be relatively likely to result in a collision.

In one embodiment, backup system 340 includes the parallel autonomy system (PAS) 342 and the failover autonomy system (FAS) 344, as discussed above with respect to FIG. 3. Parallel autonomy system 342 is arranged to provide an autonomy system which operates in parallel with a main autonomy system, and to assume control of autonomous vehicle 110 if the main autonomy system is likely to cause the unsafe operation of autonomous vehicle 110. Failover autonomy system 344 is arranged to be triggered substantially only when a failover trajectory of autonomous vehicle 110 is likely to be unsafe. In some embodiments, PAS 342 and/or FAS 344 are partially or wholly duplicative of main autonomy system 510 (e.g., including similar or same components). In other embodiments, PAS 342 and/or FAS 344 may be a lightweight version of main autonomy system 510; for example, PAS 342 and/or FAS 344 may include fewer components, reduced functionalities, may plan and/or analyze trajectories based on a reduced dataset, etc., as compared to main autonomy system 510. Thus for simplicity, the details of the sub-components of the PAS 342 and FAS 344 are not shown in the figures.

When autonomous vehicle 110 is operating autonomously under control of main autonomy system 510, main autonomy system 510 may be considered to be primarily responsible for operating autonomous vehicle 110. On the other hand, when autonomous vehicle 110 is operating under control of a human operator through communication/processing equipment 410 via communications system 335, system 400 may be considered to be primarily responsible for operating autonomous vehicle 110.

When parallel autonomy system 342 determines that autonomous vehicle 110 is likely to operate in an unsafe manner, e.g., autonomous vehicle 110 is likely headed for a collision, when operated by a main autonomy system, parallel autonomy system 342 may effectively override the main autonomy system and assume control of autonomous vehicle 110. When failover autonomy system 344 determines that a failover trajectory for autonomous vehicle 110 is likely to result in a collision, failover autonomy system 344 is arranged to trigger, and to override the main autonomy system. In general, backup system 340 takes over control of autonomous vehicle 110 when it is determined that without backup system 340 taking over control, autonomous vehicle 110 is likely to be involved in a collision.

In one embodiment, as described above, the PAS 342 is arranged to operate substantially in parallel with a main autonomy system. The PAS 342 substantially provides a redundant, or a back-up system, in the event that the main autonomy system is compromised, e.g., compromised by an error or a bug. The PAS 342 is generally active when the main autonomy system is active. Based on a lightweight perception system and the kinematics of an autonomous vehicle, such as an autonomous robot or autonomous robotic vehicle, the PAS 342 detects when a corresponding main autonomy system is reasonably likely to react too late, e.g., to a situation, to avoid a collision with another agent. In such a situation, the PAS 342 generally triggers emergency braking or an evasive maneuver to avoid the collision.

Typically, the PAS 342 runs in parallel with a main autonomy system. The main autonomy system may either be an autonomy system onboard a vehicle or may be an autonomy system associated with a teleoperations system, e.g., an autonomy system provided by a remote vehicle operator. The PAS 342 may include a processor, memory, and/or set of sensors that is separate from the main autonomy system to provide redundancy.

The PAS 342, in one embodiment, is configured to intervene when there is an issue, e.g., a fault, with a main autonomy system that is not detected in the main autonomy systems. By way of example, when the main autonomy provides a planner trajectory that would lead to an unavoidable collision, the PAS 342 may intervene. In addition, for a main autonomy system associated with a remote operator, the PAS 342 may intervene if inattentiveness of the remote operator is detected.

In one embodiment, the FAS 344 is arranged to operate with respect to an autonomous vehicle that also includes a main autonomy system. The FAS 344 is substantially triggered, or runs, when there is an issue with an upstream trajectory of an autonomous vehicle. In other words, when a planned path of an autonomous vehicle appears to be likely to result in a collision, the FAS 344 may take over control of the autonomous vehicle to allow the autonomous vehicle to safely come to a stop. In one embodiment, based on a lightweight perception system and the kinematics of an autonomous vehicle such as an autonomous robot or autonomous robotic vehicle, the FAS 344 may detect when a planned failover trajectory is reasonably likely to result in a collision between the autonomous vehicle and another agent. In such a situation, the FAS 344 generally triggers emergency braking. In some embodiments, activation of FAS 344 also causes execution of a failover trajectory and/or termination of execution of the trajectory of main autonomy system 510. A failover trajectory may be generated by main autonomy system 510 until activation of FAS 344, after which FAS 344 may generate one or more failover trajectories.

The FAS 344, in one embodiment, is configured to intervene when there is a fault with a main autonomy system that is detected in the main autonomy system. The faults may include, but are not limited to including, a sensor failure, a computer failure, and/or a software module failure or crash.

In one embodiment in order to reduce the risk that any issues with the main autonomy system also affect the FAS 344, hardware and/or software used for the FAS 344 are decoupled from the main autonomy system. Generally, dependencies between the main autonomy system and the FAS may be substantially decoupled.

Figure 6:
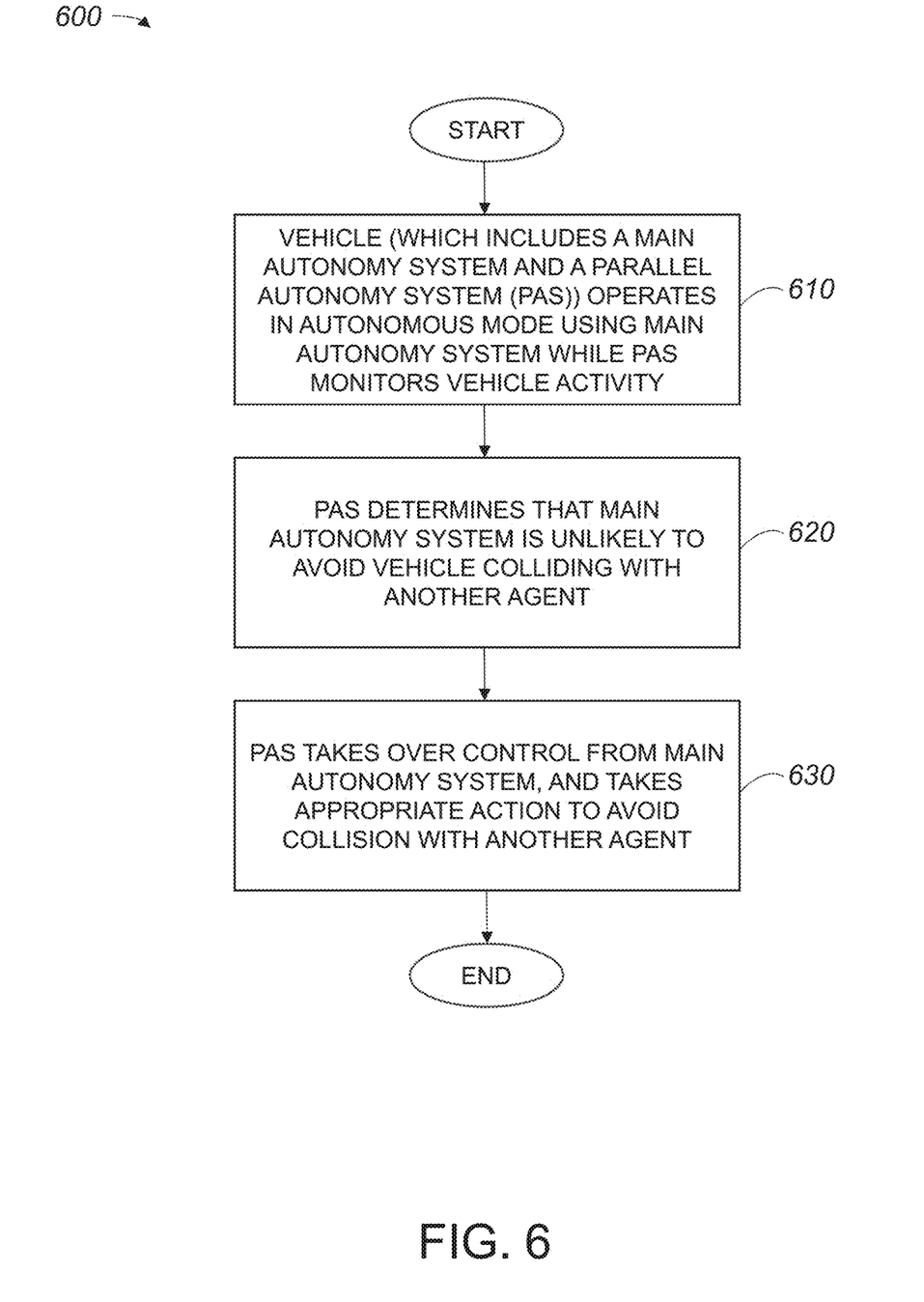
FIG. 6 is a process flow diagram for a method of operating a parallel autonomy system (PAS), according to an example embodiment.

Referring next to FIG. 6, a method associated with the operation of the PAS 342 will be described in accordance with an embodiment. Reference is also made to FIG. 5 in connection with the description of FIG. 6. The method 600 begins at operation 610 in which a vehicle, e.g., an autonomous vehicle that includes a main autonomy system and the PAS 342, operates in autonomous mode using the main autonomy system while the PAS 342 substantially monitors vehicle activity. In one embodiment, the vehicle drives autonomously using the main autonomy system while the PAS 342 effectively provides monitoring of the vehicle through a lightweight perception system and knowledge of the kinematics of the vehicle. It should be appreciated that the PAS 342 is generally substantially decoupled from the main autonomy system such that the risk of a failure or an anomaly in the main autonomy system would be unlikely to have an effect on the PAS 342. For example, the PAS 342 may effectively be separate from the main autonomy system in terms of hardware components and/or software components, and dependencies between the main autonomy system and the PAS 342 may be substantially decoupled.

From operation 610, process flow proceeds to operation 620 in which the PAS 342, through the use of at least a lightweight analysis of data collected by sensors (e.g., sensor system 320) and/or knowledge of the kinematics of the vehicle, determines that the main autonomy system is unlikely to avoid causing the vehicle to collide with another agent. That is, the PAS 342 determines that if the main autonomy system continues to drive or to control the vehicle, the vehicle will most likely be involved in a collision. As such, in operation 630, the PAS 342 takes over control from the main autonomy system and takes appropriate action to avoid a collision with another agent. In one embodiment, the PAS 342 may override actions taken by the main autonomy system and assume responsibility for driving or controlling the vehicle. To avoid a collision, the PAS 342 may trigger emergency braking, or may trigger the performance of an evasive maneuver. Once the PAS 342 takes appropriate action, the method of operating a PAS 342 is completed.

Figure 7:
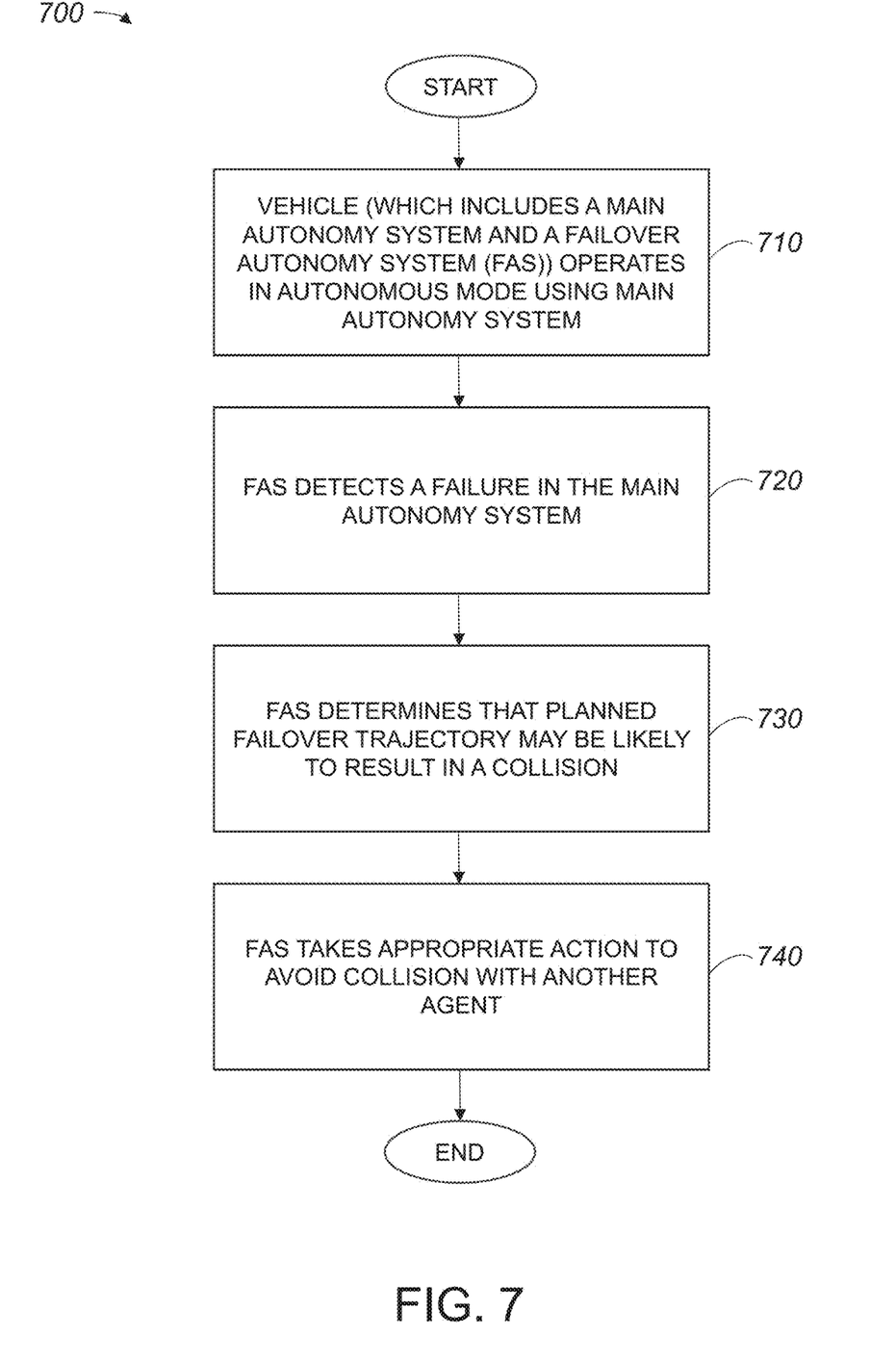
FIG. 7 is a process flow diagram for a method of operating a failover autonomy system (FAS), according to an example embodiment.

FIG. 7 is a process flow diagram for a method 700 of operating the FAS 344 in accordance with an embodiment. Reference is also made to FIG. 5 in connection with the description of FIG. 7. The method 700 of operating the FAS 344 begins at operation 710 in which a vehicle operates in autonomous mode using a main autonomy system. The vehicle includes a main autonomy system and the FAS 344. In the described embodiment, the main autonomy system may be an autonomy system onboard the vehicle, or the main autonomy system may be associated with a teleoperations system that remotely drives or controls the vehicle.

During the autonomous operation of the vehicle, the FAS 344 detects a failure in the main autonomy system in operation 720. At operation 730, the FAS 344 determines that a planned failover trajectory for the vehicle may be likely to result in a collision, or that it would be prudent for the vehicle to come to a stop. In other words, the FAS 344 determines that a planned failover path for the vehicle may result in a collision between the vehicle and another agent. When FAS 344 is activated and determines that the planned failover trajectory may likely result in a collision, the FAS 344 takes appropriate action, at 740. The appropriate action is generally a braking action that allows the autonomous vehicle to safely come to a stop. After the FAS 344 takes appropriate action to avoid a collision, e.g., after the FAS 344 takes a braking action or makes an evasive maneuver, the method of operating a FAS 344 is completed.

Figure 8:
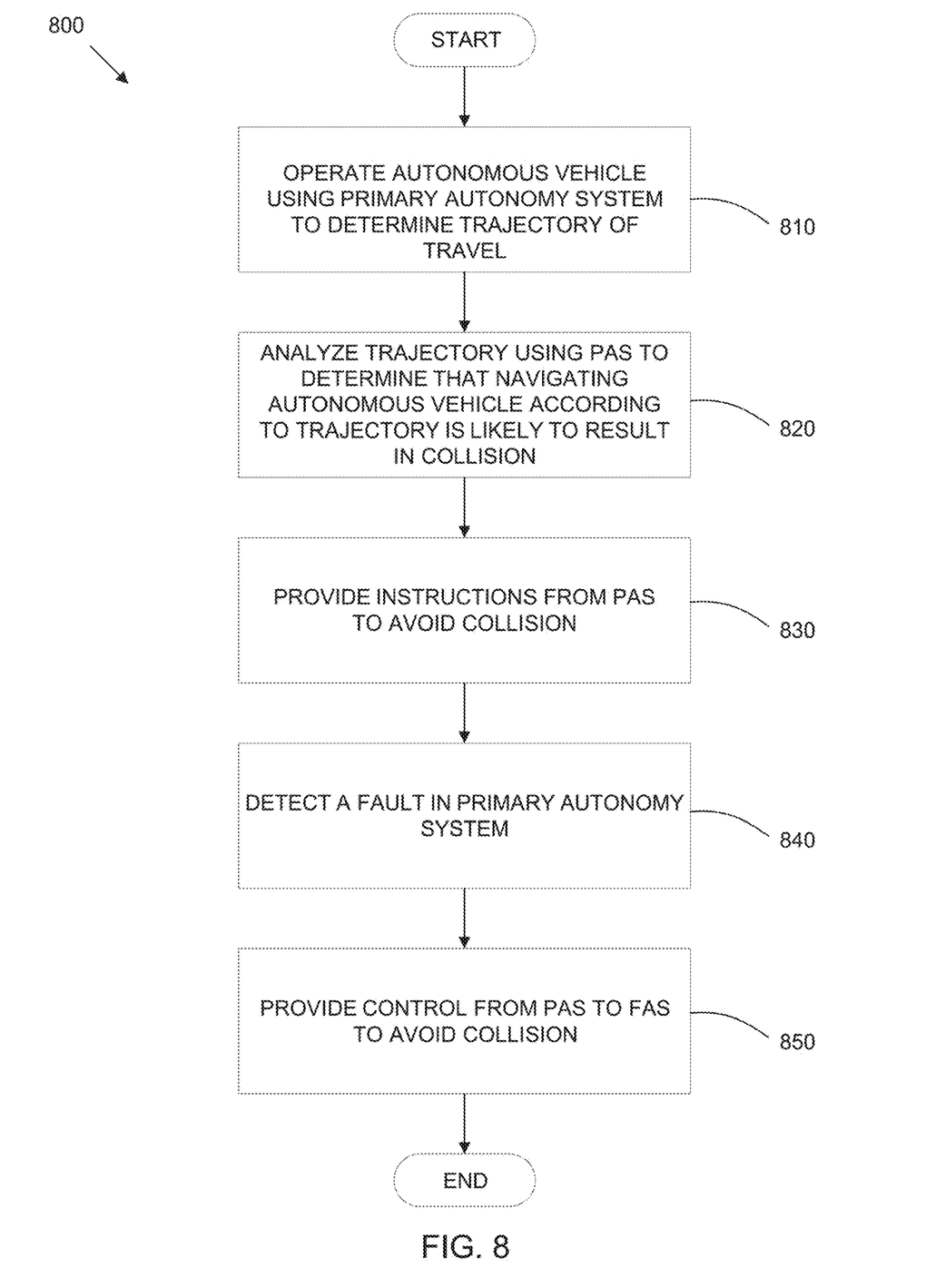
FIG. 8 is a process flow diagram for a method of operating an autonomous vehicle and employing the PAS and the FAS, according to an example embodiment.

FIG. 8 is a process flow diagram for a method 800 of operating an autonomous vehicle using the PAS 342 and FAS 344. Reference is also made to FIG. 5 for the description of FIG. 8. At operation 810, an autonomous vehicle 110 is operated using a main autonomy system to determine the trajectory of travel. The main autonomy system may be substantially similar to main autonomy system 510, as discussed with reference to FIG. 5, and which may include, at least in part, functionality provided by propulsion system 310, navigation system 315, sensor system 320, power system 325, and control system 330. Autonomous vehicle 110 may move along a particular path based on or substantially similar to the trajectory provided to propulsion system 310 by the main autonomy system. In particular, data collected by sensor system 320 is analyzed to identify a trajectory for autonomous vehicle 110, and instructions are provided to propulsion system 310 to cause autonomous vehicle 110 to navigate accordingly.

At operation 820, it is determined that navigating autonomous vehicle 110 according to the trajectory is likely to result in a collision. A likely collision can be identified by analyzing, by PAS 342, the planned trajectory. In general, PAS 342 identifies a likely collision when a probability that a collision will occur is greater than the probability that the collision will not occur. PAS 342 may compare the probability of a collision to a predetermined threshold to determine whether a collision is likely.

In response to determining that navigating autonomous vehicle 110 according to the trajectory is likely to result in a collision, instructions are provided from PAS 342 to propulsion system 310 to cause autonomous vehicle 110 to avoid a collision, at operation 830. PAS 342 can provide instructions to avoid the collision by causing autonomous vehicle 110 to alter its planned trajectory, such as by braking, stopping, performing an evasive maneuver, and/or navigating along a new or different trajectory. When the collision is avoided, the main autonomy system may continue to provide instructions to the propulsion system to cause autonomous vehicle 110 to navigate along a trajectory, which may be a newly-computed trajectory. In some embodiments, one or more external airbags may be deployed in response to determining that a collision is likely; the number and/or location of airbags that are deployed may be determined based on the nature of the likely collision, such as the size and/or relative position of an object (e.g., a person) relating to the likely collision.

At operation 840, a fault in the main autonomy system is detected. A fault in the main autonomy system can include, e.g., a sensor failure, a computer failure, and/or a software module failure or crash. The fault may be detected by analyzing operations of the main autonomy system by either the main autonomy system itself or by backup system 340.

In response to detecting a fault in the main autonomy system, control of propulsion system 310 is provided from the main autonomy system to FAS 344 at operation 850. FAS 344 is configured to substantially override a planned failover trajectory, or path, for autonomous vehicle 110 in the event that a fault is detected that would cause the planned failover trajectory to appear to be likely to lead to a collision. In some embodiments, activation of FAS 344 causes PAS 342 to be deactivated, or PAS 342 deactivates in response to activation of FAS 344. Activation of FAS 344 may not necessarily cause or enable FAS 344 to influence the behavior (e.g., change the trajectory) of vehicle 110. Rather, FAS 344 may take control of vehicle 110 in response to FAS 344 detecting that a failover trajectory is likely to lead to a collision. In some embodiments, one or more external airbags may be deployed in response to determining that the planned failover trajectory is likely to lead to a collision; the number and/or location of airbags that are deployed may be determined based on the nature of the likely collision, such as the size and/or relative position of an object relating to the likely collision.

Figure 9:
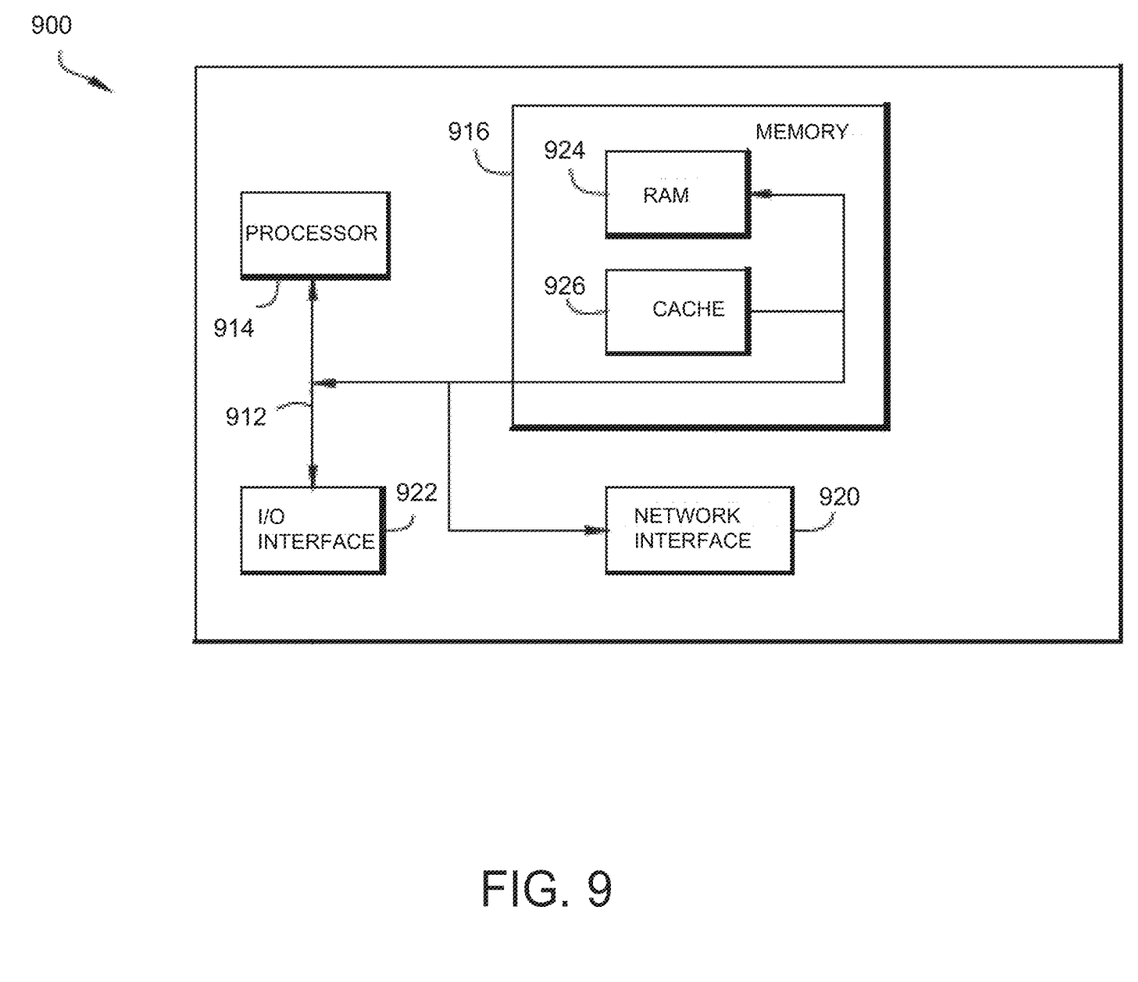
FIG. 9 is a hardware block diagram of a computing device that may perform functions of the autonomous vehicle, according to the example embodiments presented herein.

FIG. 9 is a block diagram depicting components of a computing device 900 suitable for executing the methods disclosed herein. Computing device 900 may be representative of a computing device suitable for an implementation of some or all of the functions of autonomous vehicle 110 and/or its components in accordance with example embodiments. It should be appreciated that FIG. 9 provides only an illustration of one embodiment and does not imply any limitations with regard to the environments in which different embodiments may be implemented. Many modifications to the depicted environment may be made.

As depicted, the computing device 900 includes communications fabric 912, which provides communications between computer processor(s) 914, memory 916, network interface 920, and input/output (IO) interface(s) 922. Communications fabric 912 can be implemented with any architecture designed for passing data and/or control information between processors (such as microprocessors, communications and network processors, etc.), system memory, peripheral devices, and any other hardware components within a system. For example, communications fabric 912 can be implemented with one or more buses.

Memory 916 are computer readable storage media. In the depicted embodiment, memory 916 includes random access memory (RAM) 924 and cache memory 926. In general, memory 916 can include any suitable volatile or non-volatile computer readable storage media.

One or more programs may be stored in memory 916 for execution by one or more of the respective computer processors 914 via one or more memories of memory 916. The memory 916 may further include a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by memory 916 may also be removable. For example, a removable hard drive may be used for portions of memory 916. Other examples include optical and magnetic disks, thumb drives, and smart cards that are inserted into a drive for transfer onto another computer readable storage medium that is also part of memory 916.

Network interface 920, in these examples, provides for communications with other data processing systems or devices. In these examples, network interface 920 includes one or more network interface cards. Network interface 920 may provide communications through the use of either or both physical and wireless communications links.

I/O interface(s) 922 allows for input and output of data with other devices that may be connected to computing device 900. For example, I/O interface 922 may provide a connection to external devices such as a keyboard, keypad, a touch screen, and/or some other suitable input device.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

Data relating to providing a failover and parallel autonomy system for autonomous vehicles (e.g., sensor data, navigation data, planned trajectory data, failover trajectory data, vehicle control instructions data, etc.) may be stored within any conventional or other data structures (e.g., files, arrays, lists, stacks, queues, records, etc.) and may be stored in any desired storage unit (e.g., database, data or other repositories, queue, etc.). The data transmitted between autonomous vehicle 110, communications system 335, backup system 340, system 400, and/or main autonomy system 510 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to providing a failover and parallel autonomy system for autonomous vehicles (e.g., sensor data, navigation data, planned trajectory data, failover trajectory data, vehicle control instructions data, etc.) may include any information provided to, or generated by, autonomous vehicle 110, communications system 335, backup system 340, system 400, and/or main autonomy system 510. Data relating to providing a failover and parallel autonomy system for autonomous vehicles may include any desired format and arrangement, and may include any quantity of any types of fields of any size to store any desired data. The data relating to providing a failover and parallel autonomy system for autonomous vehicles may include any data collected about entities by any collection mechanism, any combination of collected information, and any information derived from analyzing collected information.

It will be appreciated that the embodiments described above and illustrated in the drawings represent only a few of the many ways of providing autonomy systems for autonomous vehicles.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., communications software, autonomous vehicle 110 software, communications system 335 software, backup system 340 software, system 400 software, and/or main autonomy system 510 software, etc.). These systems may include any types of monitors and input devices (e.g., keyboard, mouse, voice recognition, etc.) to enter and/or view information.

It is to be understood that the software (e.g., communications software, autonomous vehicle 110 software, communications system 335 software, backup system 340 software, system 400 software, and/or main autonomy system 510 software, etc.) of the present embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present embodiments (e.g., communications software, autonomous vehicle 110 software, communications system 335 software, backup system 340 software, system 400 software, and/or main autonomy system 510 software, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to providing autonomy systems for autonomous vehicles). The database system may be implemented by any number of any conventional or other databases, data stores or storage structures (e.g., files, databases, data structures, data or other repositories, etc.) to store information (e.g., data relating to providing autonomy systems for autonomous vehicles). The database system may be included within or coupled to the server and/or client systems. The database systems and/or storage structures may be remote from or local to the computer or other processing systems, and may store any desired data (e.g., data relating to providing autonomy systems for autonomous vehicles).

The terminology used herein is for the purpose of describing particular embodiments only and is not intended to be limiting of the described embodiments. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the described embodiments. The embodiments were chosen and described in order to enable others of ordinary skill in the art to understand the various embodiments with various modifications as are suited to the particular use contemplated.

It should be understood that the disclosure may be embodied in many other specific forms without departing from the spirit or the scope of the present disclosure. By way of example, a backup system has generally been described as having both a PAS and an FAS. A backup system, however, is not limited to having both a PAS and an FAS. A backup system may include substantially only a PAS or substantially only an FAS.

A PAS has been described as substantially assuming control of an autonomous vehicle if a collision is deemed to be likely due to a failure that is not detected in a main autonomy system, and a FAS has been described as assuming control of an autonomous vehicle if a failover trajectory is deemed as likely to result in a collision due to a failure that is detected in the main autonomy system. It should be appreciated that factors used to determine when a collision is considered to be likely may vary widely without departing from the spirit or the scope. For example, a collision may be considered to be likely if the probability that a collision will occur exceeds a predetermined threshold.

In one embodiment, a PAS is configured to intervene during the course of "normal" autonomous driving. As such, the PAS may generally take evasive measures or braking measures to avoid a potential collision. While the PAS may intervene during the course of normal autonomous driving, a FAS may be arranged to intervene when it is prudent to cause an autonomous vehicle to safely come to a stop.

In general, a backup system may be arranged to substantially compensate for various types of errors, bugs, and/or failures or faults associated with a main autonomy system, whether the main autonomy system is a system onboard an autonomous vehicle, or a teleoperations system that may be remote with respect to the autonomous vehicle, but may use some components on the autonomous vehicle. In one embodiment, errors, bugs, and/or failures may generally be associated with autonomy systems and components of autonomy systems. For instance, errors, bugs, and/or failures of faults may be associated with sensors including, but not limited to including, cameras, LiDAR sensors, and radar.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

According to one aspect, a vehicle with autonomous capabilities includes a main autonomy system and a parallel autonomy system. The vehicle also includes a failover autonomy system. The parallel autonomy system and the failover autonomy system form a backup autonomy system. The parallel autonomy system is arranged to operate in parallel with the main autonomy system and is also arranged to supplement the operation of the main autonomy system by detecting failures in the main autonomy system that are not detected in the main autonomy system. The parallel autonomy system may intervene when there is a failure in the main autonomy system that is not detected by the main autonomy system. An overall platform for the operation of the autonomous vehicle includes a remotely operated system which allows a remote human operator to substantially control, e.g., drive the vehicle. The failover autonomy system is configured to intervene when there is a failure in the main autonomy system that is detected in the main autonomy system.

In one form, a method includes: operating an autonomous vehicle using a main autonomy system that analyzes data collected by a sensor system of the autonomous vehicle to determine a trajectory of travel of the autonomous vehicle, and wherein the main autonomy system provides instructions to a propulsion system of the autonomous vehicle to cause the propulsion system to navigate the autonomous vehicle according to the trajectory, determining that navigating the autonomous vehicle according to the trajectory is likely to result in a collision, in response to determining that navigating the autonomous vehicle according to the trajectory is likely to result in collision, providing instructions from a parallel autonomy system to the propulsion system to cause the autonomous vehicle to avoid collision, detecting a fault in the main autonomy system, and in response to detecting the fault in the main autonomy system, providing control of the propulsion system from the main autonomy system to a failover autonomy system, wherein the failover autonomy system is configured to override the propulsion system.

In another form, the main autonomy system continues to provide instructions to the propulsion system in response to the instructions from the parallel autonomy system causing the autonomous vehicle to avoid collision.

In another form, the main autonomy system comprises a first one or more processors and a first memory, and the parallel autonomy system and the failover autonomy system comprises a second one or more processors and a second memory.

In another form, operating the autonomous vehicle using the main autonomy system by a remote operator sending instructions to the main autonomy system to operate the autonomous vehicle.

In another form, analyzing includes comparing a probability value representing a likelihood of collision to a predefined threshold to determine that navigating the autonomous vehicle according to the trajectory is likely to result in the collision.

In another form, the fault in the main autonomy system includes one or more of: a failure of the sensor system, a hardware failure, and a software failure.

In another form, providing instructions from the parallel autonomy system includes providing instructions to the propulsion system for performing a braking operation or performing an evasive maneuver.

In another form, navigating the autonomous vehicle according to the failover autonomy system causes the autonomous vehicle to brake to a stop.

In another form, the failover autonomy system overrides the propulsion system in response to the failover autonomy system determining that a failover trajectory is likely to result in collision.

The above description is intended by way of example only. There are numerous modifications and variations apparent those of ordinary skill in the art and such modifications and variations do not depart from the scope of the embodiments presented herein.

What is claimed is:

1. A method comprising:
operating an autonomous vehicle using a main autonomy system that analyzes data collected by a sensor system of the autonomous vehicle to determine a trajectory of travel of the autonomous vehicle, and wherein the main autonomy system provides instructions to a propulsion system of the autonomous vehicle to cause the propulsion system to navigate the autonomous vehicle according to the trajectory;
determining that navigating the autonomous vehicle according to the trajectory is likely to result in a collision;
in response to determining that navigating the autonomous vehicle according to the trajectory is likely to result in collision, providing instructions from a parallel autonomy system to the propulsion system to cause the autonomous vehicle to avoid collision;
detecting a fault in the main autonomy system; and
in response to detecting the fault in the main autonomy system, providing control of the propulsion system from the main autonomy system to a failover autonomy system, wherein the failover autonomy system is configured to override the propulsion system.

2. The method of claim 1, wherein the main autonomy system continues to provide instructions to the propulsion system in response to the instructions from the parallel autonomy system causing the autonomous vehicle to avoid collision.

3. The method of claim 1, further comprising:
operating the autonomous vehicle using the main autonomy system by a remote operator sending instructions to the main autonomy system to operate the autonomous vehicle.

4. The method of claim 1, wherein analyzing includes comparing a probability value representing a likelihood of collision to a predefined threshold to determine that navigating the autonomous vehicle according to the trajectory is likely to result in the collision.

5. The method of claim 1, wherein the fault in the main autonomy system includes one or more of: a failure of the sensor system, a hardware failure, and a software failure.

6. The method of claim 1, wherein providing instructions from the parallel autonomy system includes providing instructions to the propulsion system for performing a braking operation or performing an evasive maneuver.

7. The method of claim 1, wherein providing control of the propulsion system to the failover autonomy system causes the autonomous vehicle to brake to a stop.

8. The method of claim 1, wherein the failover autonomy system overrides the propulsion system in response to the failover autonomy system determining that a failover trajectory is likely to result in collision.

9. A computer system comprising:
one or more computer processors;
one or more computer readable storage media;
program instructions stored on the one or more computer readable storage media for execution by at least one of the one or more computer processors, the program instructions comprising instructions to:
operate an autonomous vehicle using a main autonomy system that analyzes data collected by a sensor system of the autonomous vehicle to determine a trajectory of travel of the autonomous vehicle, and wherein the main autonomy system provides instructions to a propulsion system of the autonomous vehicle to cause the propulsion system to navigate the autonomous vehicle according to the trajectory;
determine that navigating the autonomous vehicle according to the trajectory is likely to result in a collision;
in response to determining that navigating the autonomous vehicle according to the trajectory is likely to result in collision, provide instructions from a parallel autonomy system to the propulsion system to cause the autonomous vehicle to avoid collision;
detect a fault in the main autonomy system; and
in response to detecting the fault in the main autonomy system, provide control of the propulsion system from the main autonomy system to a failover autonomy system, wherein the failover autonomy system is configured to override the propulsion system.

10. The computer system of claim 9, wherein the main autonomy system continues to provide instructions to the propulsion system in response to the instructions from the parallel autonomy system causing the autonomous vehicle to avoid collision.

11. The computer system of claim 9, wherein the main autonomy system comprises a first one or more processors and a first memory, and the parallel autonomy system and the failover autonomy system comprises a second one or more processors and a second memory.

12. The computer system of claim 9, wherein the program instructions further comprise instructions to:
operate the autonomous vehicle using the main autonomy system by a remote operator sending instructions to the main autonomy system to operate the autonomous vehicle.

13. The computer system of claim 9, wherein the instructions to analyze include instructions to compare a probability value representing a likelihood of collision to a predefined threshold to determine that navigating the autonomous vehicle according to the trajectory is likely to result in the collision.

14. The computer system of claim 9, wherein the fault in the main autonomy system includes one or more of: a failure of the sensor system, a hardware failure, and a software failure.

15. The computer system of claim 9, wherein the failover autonomy system overrides the propulsion system in response to the failover autonomy system determining that a failover trajectory is likely to result in collision.

16. An autonomous vehicle comprising:
a propulsion system;
a sensor system;
a main autonomy system configured to analyze data collected by the sensor system to determine a trajectory of travel of the autonomous vehicle, and to provide instructions to the propulsion system to cause the propulsion system to navigate the autonomous vehicle according to the trajectory;
a backup system to the main autonomy system, the backup system including a parallel autonomy system and a failover autonomy system;
wherein the parallel autonomy system is configured to:
determine that navigating the autonomous vehicle according to the trajectory is likely to result in a collision; and
in response to determining that navigating the autonomous vehicle according to the trajectory is likely to result in collision, provide instructions to the propulsion system to cause the autonomous vehicle to avoid collision;
wherein the failover autonomy system is configured to:
detect a fault in the main autonomy system; and
in response to detecting the fault in the main autonomy system, take over control of the propulsion system from the main autonomy system, and to override the propulsion system.

17. The autonomous vehicle of claim 16, wherein the main autonomy system continues to provide instructions to the propulsion system in response to the instructions from the parallel autonomy system causing the autonomous vehicle to avoid collision.

18. The autonomous vehicle of claim 16, wherein the main autonomy system comprises a first one or more processors and a first memory, and the parallel autonomy system and the failover autonomy system comprises a second one or more processors and a second memory.

19. The autonomous vehicle of claim 16, wherein main autonomy system is operated by a remote system that sends instructions to the main autonomy system to operate the autonomous vehicle.

20. The autonomous vehicle of claim 16, wherein the main autonomy system is configured to compare a probability value representing a likelihood of collision to a predefined threshold to determine that navigating the autonomous vehicle according to the trajectory is likely to result in the collision.

21. The autonomous vehicle of claim 16, wherein the fault in the main autonomy system includes one or more of: a failure of the sensor system, a hardware failure, and a software failure.

22. The autonomous vehicle of claim 16, wherein the failover autonomy system overrides the propulsion system in response to the failover autonomy system determining that a failover trajectory is likely to result in collision.

* * * * *